United States Patent [19]

Hedrick

[11] 3,808,431

[45] Apr. 30, 1974

[54] OPTICAL ENCODER

[76] Inventor: Geoffrey S. Hedrick, Laurel Cir., Malvern, Pa. 19355

[22] Filed: Apr. 26, 1973

[21] Appl. No.: 354,635

[52] U.S. Cl. .......................... 250/231 SE, 356/170
[51] Int. Cl. .......................................... G01d 5/34
[58] Field of Search.. 250/208, 209, 231 R, 231 SE, 250/237; 356/169, 170, 141

[56] References Cited

UNITED STATES PATENTS

| | | | |
|---|---|---|---|
| 3,525,094 | 8/1970 | Leonard | 250/231 SE |
| 3,549,897 | 12/1970 | Blake | 356/141 |
| 2,953,777 | 9/1960 | Gridley | 250/231 SE |

*Primary Examiner*—James W. Lawrence
*Assistant Examiner*—D. C. Nelms
*Attorney, Agent, or Firm*—Hubbell, Cohen & Stiefel

[57] ABSTRACT

An improved optical encoder utilizing a U-type scan of the optically readable code pattern bands which contain an altitude reporting code pattern thereon wherein means are provided for selectively illuminating a pair of light sources which lead and lag, respectively, the transition point for the respective code pattern so as to alternately illuminate the band to provide the U-type scan of the band. Photo sensors are located on the opposite side of the code pattern disc from the light sources in pairs with one of the photo sensors being positioned before the transition point in a direction of increasing count and the other sensor being positioned after the transition point, the sensors being respectively optically aligned with the light sources. The lead and lag sensors of the pair are electrically directly connected together in parallel with means being provided for switching the lag sensor associated light source off and the lead sensor associated light source on substantially at the transition point. The encoder also includes an output means operatively connected to each photo sensor pair for providing an electrical signal therefrom in one state and blocking this signal in another state. A current-controlled switching means provided a programmable switching point for the output means and includes means for synching the associated electrical signal output current of the sensor means until this current value exceeds a predetermined current value for controlling the state of the output means so as to bias the output means to its signal provision state only when the sensor provided electrical signal exceeds this predetermined current value. The programmable switching means preferably comprises a field effect transistor network and includes a programming resistance for setting the predetermined current value in series with a thermistor so as to compensate for variations in sensor sensitivity due to variations in temperature. If desired, the programmable switching means may instead comprise a continuous code pattern band on the disc having half the normal width of a normal band with the output of the associated sensor for this band determining the predetermined current value. Failure monitor circuitry may be provided comprising a transistor switching network in parallel with a current limiting resistor associated with the light source power supply so that when an interrogate pulse is provided to the switching network, the current limiting resistance is short circuited to increase the current supply to the light sources and turn on all the light sources to provide allight output which is a predetermined multiple of the normal light output thus generating a unique outpost signal indicative of the operability of the optical encoder.

30 Claims, 7 Drawing Figures

OPTICAL ENCODER

BACKGROUND OF THE INVENTION

1. Field of the Invention

The present invention relates to an improved optical encoder utilizing U-type scanning.

2. Description of the Prior Art

Optical encoders, that is digital encoders for an input variable represented by rotation of a shaft, such as for encoding the altitude reading of an altimeter, wherein transparent encoded discs having opaque tracks thereon in the form of a conventional ICAO or Gray code, are well known. An example of such an optical encoder is disclosed in U.S. Pat. No. 3,660,830. Such prior art encoders utilize a pair of encoder discs having arcuate tracks or bit paths bearing rotational position indicia and means, such as photo sensors, for sensing the indicia, one of the discs being driven at a relatively low average speed and the other disc being driven at a higher speed. The low speed disc normally carries higher order or coarse data and the higher speed disc normally carries fine data. Thus, assuming an 11 bit ICAO code, the least six significant bits are normally carried on the high speed disc and the five most significant bits are normally carried on the low speed disc. Prior art U-type scanning optical encoders utilize an optically switched signal to make a logic decision from the lead to the lag sensor in an attempt to eliminate the requirement for high accuracy or transition point switching. However, these prior art optical encoders have inaccuracies due to disc eccentricity, gear train backlash, etc. In addition, these prior art encoders require complex logic circuitry associated with each of the photo sensor pairs as well as separate amplifiers for each photo sensor to accomplish the proper logic selection for U-scanning of the associated optically readable code pattern bands. Thus, if U-scanning of the low speed or coarse disc having by way of example, the five most significant bits recorded thereon is accomplished, ten amplifiers and five complex logic packages would be required. This complex arrangement is both costly and inefficient.

Normally, a code pattern on the high speed disc provides a select track which provides a signal indicating when the transition point is to occur so that a logic signal is provided to this complex circuitry indicating which sensor to switch on or off. Furthermore, such prior art typical encoders utilizing photo sensors to accomplish U-scanning suffer from inaccuracies due to variations in sensitivity of the photo sensors with temperature as well as variations in power to the light sources resulting in variations in the light output. By way of example, photo sensors or photo transistors are only 50% as sensitive in cold as at room temperature. In addition, photo sensors normally leak with variations in temperature so that a current output may be produced even when the photo sensor is in dark due to the temperature environmental condition of the encoder, which may result in an erroneous signal output providing an incorrect altitude reporting code. This problem becomes particularly acute in aircraft instrumentation where accuracy is imperative. These disadvantages of the prior art are overcome by the present invention.

SUMMARY OF THE INVENTION

An improved optical encoder having at least one optically encoded rotatable disc containing an optically readable altitude reporting code pattern recorded thereon is provided. The encoder includes means for rotating at least the one disc to provide a predetermined code signal indicative of a predetermined altitude value, such as an ICAO code. The disc is opaque in predetermined regions of the surface area thereof and is light transmissable in adjacent regions for providing a plurality of code pattern bands, one band being preferably provided per bit. A transition point is provided between the adjacent regions with a pair of spaced apart selectively illuminable light sources located about the transition point on one side of the disc in optical alignment with each of the bands, one pair of light sources preferably illuminating all of the bands. A pair of spaced apart photo sensors are located on the opposite side of the disc in optical alignment with each of the bands with each of the photo sensors of the pair being optically aligned with a different associated one of the light sources and being responsive thereto when the associated light source illuminates the photo sensor to provide an electrical signal therefrom comprising the predetermined code signal. Means are provided for selectively illuminating the light sources for alternately illuminating the bands to provide a U-type scan of the bands with respect to the transition point, one of the photo sensors of each pair being positioned before the transition point in a direction of increasing count of the rotating disc and the other photo sensor being positioned after the transition point, the one before the transition point being termed the lead sensor and the one after the transition point being termed the lag sensor. Each of these lead and lag sensors are preferably electrically directly connected together in parallel.

A control network for controlling the selective illumination of the light sources is provided, this network preferably enabling the provision of illumination from the lag sensor associated light source until the rotating disc is substantially at the transition point, the lag sensor associated light source being switched off and the lead sensor associated light source being switched on substantially at the transition point so as to provide an encoded altitude reporting signal from the optically encoded disc. Most preferably, a pair of optically encoded discs are provided, one disc being a high speed disc containing the fine data and the other disc being a low speed disc containing the coarse data and being geared thereto such as by a gear ratio of 16 to 1. Most preferably the code is an 11 bit ICAO code with the five most significant bits being contained on the low speed coarse disc and with the preferred U-scanning technique being applied to this coarse disc. A select track or switching pattern is optically encoded on the high speed or fine disc and generates the switching signals to the control network which switches the lag or lead sensor associated light sources on and off.

The control network preferably comprises a transistor switching network including a first transistor switch electrically connected to the select track sensor of the high speed disc which controls the turning on and off of the lag sensor associated light source. In addition, a second transistor switch is electrically connected to the lead sensor associated light source and is controlled by the first transistor switch so that the second transistor switch and its associated lead sensor associated light source are in the on state when the first transistor switch is off and in the off state when the first transistor switch is on. The light sources are preferably gallium arsenide diodes, as is the light source associated with the high speed disc. The high speed disc light source is electrically connected to the second transistor switch through a voltage dividing network for biasing the second transistor switch on when the first transistor switch is off while reverse biasing the gallium arsenide diode lag sensor associated light source.

A current controlled switching means is provided for providing a programmable switching point for the output of the photo sensor pair so as to synch the associated electrical signal output current of the sensor until the associated current value of the output signal exceeds a predetermined current value. Preferably, this current controlled switching means comprises a plurality of field effect transistors. In addition, the programmable switch includes a programming resistance means for setting the predetermined current value and a thermistor means coupled in series with the programming resistance for compensating for variations in sensor sensitivity due to variations in temperature. If desired, the programmable switching may be provided by another code pattern band on the disc with the band being continuous and half the normal width of a code pattern band so as to set the predetermined current value at half the normal output current of a photo sensor.

Failure monitoring is preferably provided by means of a network connected in parallel with the normal power supply to the light sources; more particularly, with a current limiting resistor normally provided for providing a predetermined current to and resultant associated light output from the light sources. The failure monitor network preferably comprises a transistor network which, in response to an interrogate pulse, short circuits this current limiting resistor to increase the input current to the light sources to a predetermined multiple thereof to, sonsequently, increase the associated light output thereof while turning on all of the light sources to provide a unique output signal from the associated photo sensors indicative of the operability of the optical encoder.

DETAILED DESCRIPTION OF THE PREFERRED EMBODIMENT

Figure 1:
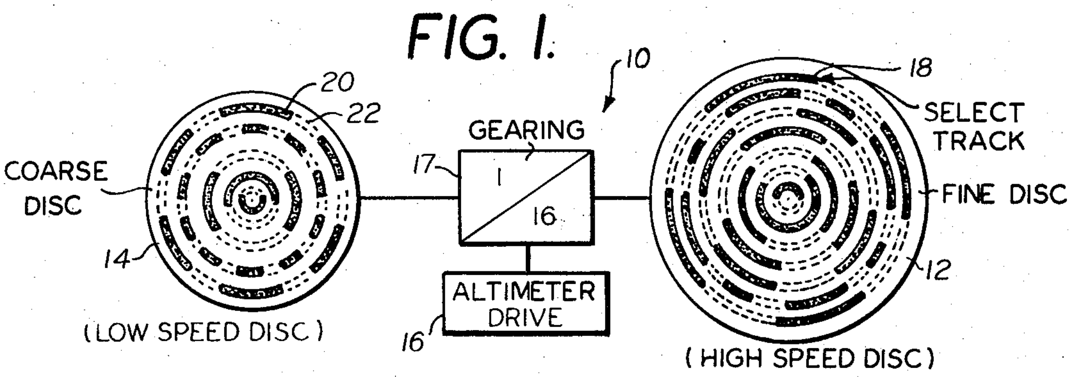
FIG. 1 is a diagramatic illustration of the gearing arrangement and an illustrative coding arrangement for the preferred optical encoder of the present invention.

Referring now to the drawings in detail, and initially to FIG. 1 thereof, a diagramatic illustration of an optical encoder generally referred to by the reference numeral 10, is shown. Preferably, the optical encoder 10 is similar to conventional optical encoders, such as the optical encoder disclosed in U.S. Pat. No. 3,660,830, subject, however, to the important exceptions to be described in greater detail hereinafter, which exceptions are directed to the improved optical encoder of the present invention. The optical encoder 10 is preferably arranged to digitally encode the altitude reading of a conventional altimeter so as to provide an altitude report in code signal representative of the altitude reading of the altimeter. Preferably, the altitude reporting code is an 11 bit ICAO code, although any other altitude reporting code such as a different Gray code could be utilized if desired. The optical encoder preferably comprises a pair of optically encoded transparent or light transmissable discs 12 and 14 which are preferably driven by a conventional altimeter drive source 16 such a conventional resolver utilized to drive the altimeter input shaft. Preferably, one of the discs, termed the fine disc 12 conventionally contained the least 6 significant bits of the 11 bit ICAO code while the other disc 14, termed the coarse disc, conventionally contains the 5 most significant bits of the ICAO code. The fine disc 12 and the coarse disc 14 are preferably interconnected by a conventional gear train which preferably provides a 16 to 1 gear ratio between the coarse 14 and fine 12 disc, fine disc 12 being a high speed disc and coarse disc 14 being a low speed disc. Preferably, the coarse disc 14, which contains the 5 most significant bits of the ICAO code, has this code photographically laid on the disc 14, such as with an ortholith photographic emulsion. Similarly, the least six significant bits are also preferably photographically laid on the fine disc 12. The disc 12, 14 may be constructed of any light transmissable medium such as crown glass. In addition, as will be described in greater detail hereinafter, the high speed disc 12 also preferably includes a select track 18 optically encoded on the fine disc 12 in the same manner as the ICAO code information.

As shown and preferred in FIG. 1, the code pattern is laid on the discs 12 and 14 in concentric bands, with, each code pattern band consisting of opaque regions 20 and light transmissable regions 22, the opaque regions 20 preventing the passage of light through the disc 12 or 14 at the location of the opaque regions. This manner of encoding the discs 12 and 14 is preferably conventional. It should be noted that the pattern illustrated in FIG. 1 is merely illustrative for purposes of explanation and is not meant to represent an actual code pattern. As also shown and preferred in FIG. 1, the select track 18 preferably has opaque regions and light transmissable regions alternating at 90° intervals about the fine disc 12. The optical encoder 10 preferably generates digitized altitude information in the ICAO altitude reporting code with a predetermined scale factor, such as 8,000 feet per turn of input shaft, although any other desired scale factor may be utilized.

Figure 2:
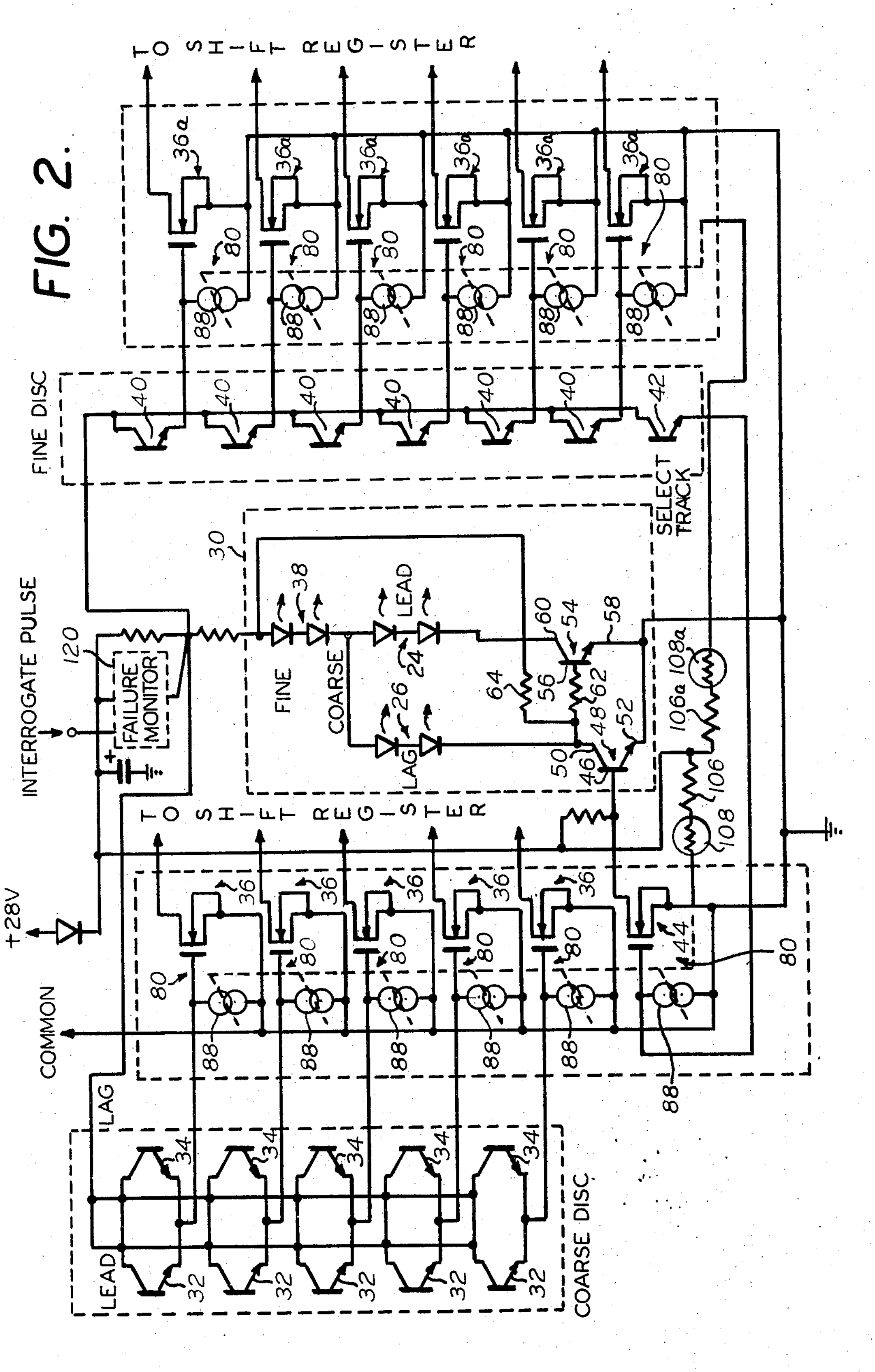
FIG. 2 is a partial schematic of the preferred optical encoder of the present invention.

Referring now to FIG. 2, and as will be be described in greater detail hereinafter, the optical encoder 10 of the present invention preferably utilizes U-scanning to read the optically encoded pattern encoded on the coarse disc 14 which contains the five most significant bits of the altitute reporting code, such U-scanning preferably not being utilized nor required for the high speed disc 12, although, if desired, such U-scanning could also be utilized for the high speed disc 12. As was previously mentioned, the high speed disc 12, via the select track 18, provides a select signal indicating when the theoretical transition point for the U-scanning of the coarse disc 14 is to occur so as to switch the sensing from the lead to the lag sensor as will be described with reference to FIG. 3.

Figures 3, 4, 5, 6, 7:
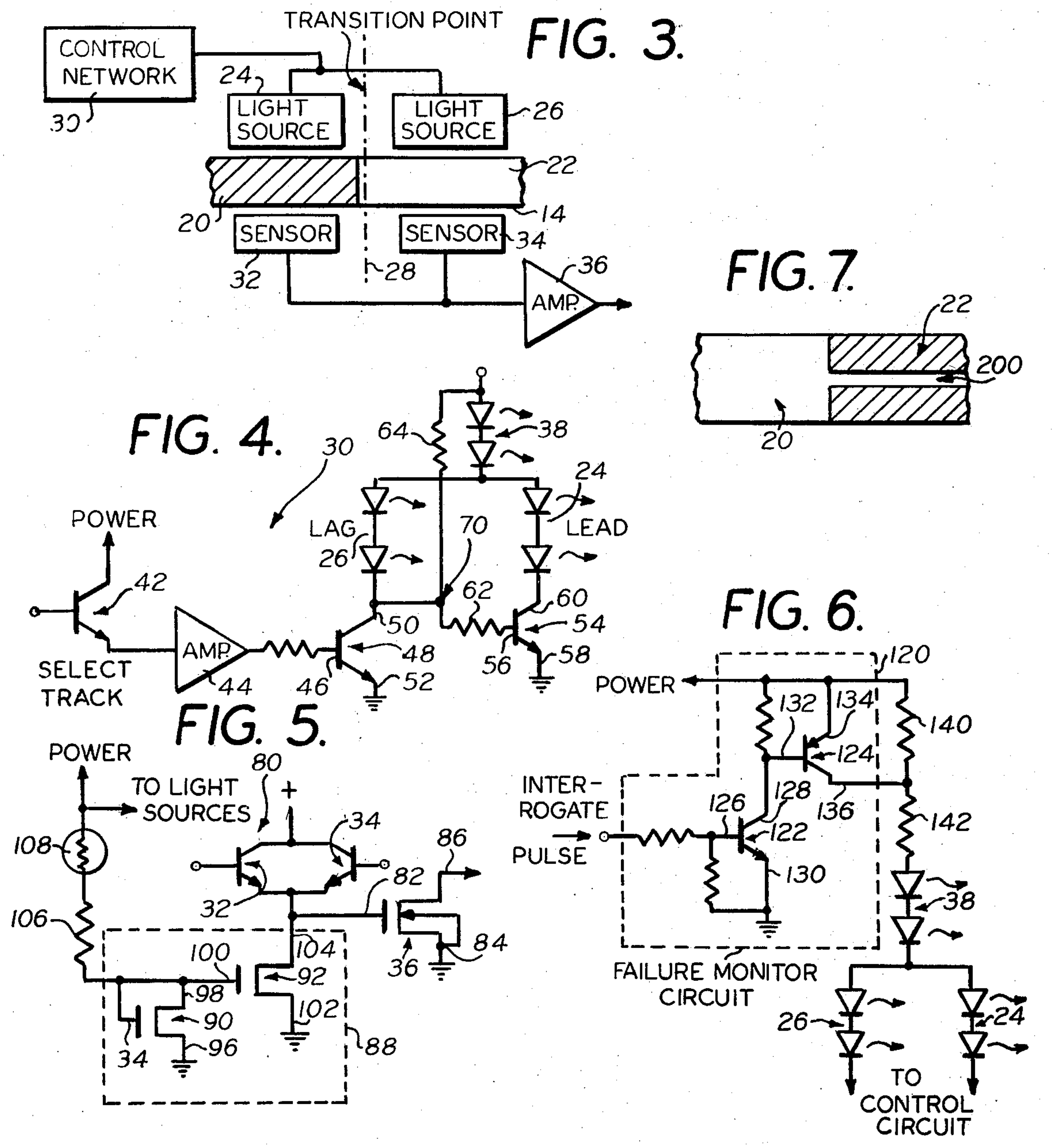
FIG. 3 is a partial diagramatic illustration of the preferred optical encoder of the present invention showing a typical pair of photo sensors.
FIG. 4 is a partial schematic diagram of the light source control network of the preferred optical encoder illustrated in FIG. 2.
FIG. 5 is a partial schematic diagram of a typical current-controlled programmable switching network associated with a typical photo sensor of the preferred optical encoder illustrated in FIG. 2.
FIG. 6 is a partial schematic diagram of the failure monitor circuitry of the preferred optical encoder illustrated in FIG. 2.
FIG. 7 is a diagrammatic illustration of a preferred typical disc track for enabling failure monitoring in accordance with the embodiment of FIG. 6.

Referring to FIG. 3, a pair of spaced apart light sources 24 and 26, such as gallium arsenide light emitting diodes, are provided for illuminating the low speed disc 14. Each of these light sources 24 and 26 is preferably capable of illuminating all of the code pattern bands contained on the coarse disc 14 and, as shall be described in greater detail hereinafter, these light sources 24 and 26 are spaced apbout the theoretical transition point 28 and are connected in parallel to be selectively illuminated due to the operation of a control network 30 to be described in greater detail hereinafter with reference to FIGS. 2 and 4. In addition, a pair of spaced apart photo sensors or photo transistors 32 and 34 are provided for each code pattern band with the sensors 32 and 34 being respectively optically aligned with the light sources 24 and 26 so as to be illuminable thereby. As shown and preferred in FIG. 3, the light sources 24 and 26 are located on one side of the disc 14 while the photo sensor pairs 32, 34 are located on the opposite side of the disc 14 so that when a light transmissable region 22 is interposed between the sensor and its respective light source, 34 and 26 in the example shown in FIG. 3, light is transmitted to the sensor 34 which provides an output signal in response thereto and, when an opaque region 20 is interposed between the sensor and its associated light source, 32 and 24, respectively in the example shown in FIG. 3, no output signal is provided from the sensor 32. As was previously mentioned, the photo sensors 32 and 34 are respectively termed the lead and the lag sensor with the lead sensor 32 being preferably positioned before the theoretical transition point 28 in a direction of increasing count of the rotating disc 14 and the lag sensor being positioned after the theoretical transition point 28.

As shown and preferred, the lead 32 and the lag sensor 34 pair are electrically directly connected in parallel to the input of an amplifier 36, to be described in greater detail hereinafter, since the output signal level from the total sensors normally at a very low level, on the order of 10 to 20 microamps, so that an amplifier 36 is normally utilized to boost the signal level for each bit that is U-scanned. Of course, if the signal level is sufficient, then the amplifier 36 may be omitted. As shown and preferred in FIG. 2, and as previously mentioned, a lead-lag sensor pair 32–34 is provided for each of the 5 most significant bits contained on the coarse disc 14. For purposes of clarity, the base connection and associated conventional circuitry of the photo sensor pairs 32–34 have been omitted in FIG. 2. As will be described in greater detail hereinafter, the U-scanning of disc 14 is accomplished as follows. As was previously mentioned, for each track of the coarse disc 14 there are two optical sensors 32 and 34. Sensor 32 leads the theoretical transition point 28 preferably by approximately 1½°, and sensor 34 preferably lags the theoretical transition point 28 by approximately the same amount. These lead and lag sensors 32 and 34 are illuminated by the logically driven light sources 24 and 26, respectively. As the opaquing pattern approaches the theoretical transition point 28, it covers the lead sensors 32, but the lag sensors 34 remain exposed provided the disc track illuminates the scanning photo transistor, the lead sensor associated light source 24 being turned off as the lag sensor associated light source 26 is turned on, as will be described in greater detail hereinafter.

Referring now to FIGS. 2 and 4, the control network 30 for accomplishing the selective illumination of the lead and lag sensor associated light source 24 and 26, respectively, shall be described. As was previously mentioned, the high speed disc 12 is preferably illuminated by a light source 38 which is also preferably a gallium arsenide light emitting diode which preferably illuminates all of the code pattern bands on the disc including the select track 18 of the high speed disc 12. Each of the code pattern bands on the fine disc 12 has an associated photo sensor 40 located on the opposite side thereof from the light source 38 with all of the photo sensors 40 being optically aligned with the light source 38 so as to be illuminable thereby, the photo sensors 40 being illuminated by the light source 38 except when an opaque region 20 of the associated code pattern band is interposed between the light source 38 and the photo sensor 40 so as to mask the photo sensor. A separate photo sensor 42 is also provided for the select track 18. Light source 38 is preferably on all the time while the optical encoder 10 is operating as opposed to the selective illumination of the coarse disc 14 light sources 24 and 26. The lead and lag light emitting diodes 24 and 26, as previously mentioned, are preferably electrically connected in parallel and, in turn, are also preferably connected in parallel to light emitting diode 38. The output of the select track photo sensor 42 is preferably connected to an amplifier 44, for boosting the output signal level as previously described with reference to amplifier 36, and is therefrom connected to the base 46 of a switching transistor 48, shown illustratively as an NPN transistor, having a collector 50 and a grounded emitter 52 in addition to base 46. A second switching transistor 54 which is also preferably an NPN transistor is provided, although if desired, PNP transistors could be utilized with appropriate circuit modifications. Transistor 54 has a base 56 a grounded emitter 58 and a collector 60. The collector 50 of transistor 48 is preferably connected in parallel to light emitting diode 26 and to the base 56 of transistor switch 54 through a resistor 62. Resistor 62 is also connected in parallel to the opposite end of light emitting diode 38 from the diode 26–24–38 interconnection through another resistor 64, which together with resistor 62 acts as a voltage dividing network, as will be described in greater detail hereinafter. The collector 60 of transistor switch 54 is connected to light emitting diode 24, with transistor switch 48 controlling the on-off condition of light emitting diode 26 and transistor switch 54 controlling the on-off condition of light emitting diode 24, with light emitting diode 38 always being on as was previously described.

Now describing the operation of the control network 30 illustrated in FIGS. 2 and 4, when sensor 42 is on, indicating a light transmissable region 22 is between sensor 42 and light source 38, an output signal or select signal is provided the base of transistor 48 to turn transistor 48 on, transistor 54 being off at this point as will be described below. When transistor 48 turns on, this turns on light emitting diode 26 so as to illuminate the lag sensors 34 associated with the coarse disc 14. Transistor switch 54 is maintained off at this time due to the potential at point 70 (FIG. 4) being approximately ground potential due to the circuit parameters and configurations chosen. When an opaque region 20 of select track 18 is interposed between the photo sensor 42 and the light source 38, photo sensor 42 is turned off and a signal is no longer provided to the base 46 of transistor switch 48. This turns transistor switch 48 off. When transistor switch 48 is off, point 70 rises to a potential value sufficient to turn transistor switch 54 on. When transistor switch 54 is on this turns on light emitting diode 24 and illuminates the lead sensors 32 associated with the coarse disc 14. Accordingly, transistor switch 48 performs a dual function, turning light emitting diode 26 on an off and turning transistor switch 54 on and off to control the operation of light emitting diode 24. When transistor switch 48 is turned off, resistors 64 and 62 act as a voltage divider while driving transistor switch 54 on and bringing point 70 to a potential such that light emitting diode 26 is reverse biased off. Accordingly, resistors 64 and 62 are preferably of approximately equal value, although resistor 62 may be slightly greater in value than resistor 64 and are selected such that the potential drop across light emitting diode 26 is less than the drive potential required for the light emitting diode 26 in the off state of transistor switch 48.

Preferably, the code pattern disc is cyclic except for the two most significant bits on coarse disc 14. The photo sensor pairs 32–34 are most preferably located at an included angle of 174° 24′. If desired, coarse disc 14 may contain 7 code pattern tracks as opposed to 5 such tracks with the 2 additional tracks mirroring the image of the two most significant bit tracks with one sensor of the pair 32–34 sensing the original image and the other sensor of the pair 32–34 sensing the mirror image for each of the two most significant bit tracks.

Now referring to FIG. 5 as well as FIG. 2, the output circuitry associated with each of the optical sensor pairs 32–34, as well as with the individual optical sensors 40 associated with fine disc 12, shall be described in greater detail, the output circuitry for both the coarse sensors 32–34 and fine sensors 40 preferably being identical. As shown and preferred, each channel or bit preferably includes a low impedance MOS switch transistor and a gate shunted programmable FET current sink. A typical such amplifier switch, generally referred to by the reference numeral 80 is shown in detail in FIG. 5, five of these amplifier switches being provided for the coarse disc 14 in the preferred embodiment illustrated in FIG. 2, preferably 12 such switches being provided in all, eleven being provided for the 11 bit code and one additional one being provided for the select track. For purposes of explanation, it shall be assumed that the circuit illustrated in FIG. 5 is operatively associated with a lead-lag photo sensor pair 32–34 although, as previously mentioned, the same circuit is equally applicable for the output circuitry associated with sensor 40 or select track sensor 42. As shown and preferred, the amplifier switch 80 preferably comprises an output transistor, which is the amplifier 36 in this example, and is preferably a field effect transistor or FET having a gate 82, a source 84 which is preferably connected to ground, and a drain 86 from which the output bit associated with the track being sensed is provided, such as preferably to a conventional shift register for subsequent transmission together with the other bits from both the coarse disc 14 and the fine disc 12 which are combined in the shift register to a serial or parallel bit altitude reporting code digital message. The output transistor 36 is preferably controlled by means of a current synch 88 which insures that output transistor 36 only provides an output signal when the associated current output from the photo sensor 32 or 34 exceeds a predetermined value. The current synch 88 preferably includes a pair of field effect transistors 90 and 92 each having a gate, a grounded source, and a drain, 94,96 and 98, respectively, for transistor 90, and 100, 102, and 104, respectively, for transistor 92. Transistor 90 is a control transistor and has the drain 98 and the gate 94 thereof connected or tied together with the source 96 being connected to ground. Transistor 92 is preferably matched with transistor 90 and has the gate 100 thereof connected to the drain 98 of transistor 90 and the drain 104 thereof connected in parallel to the gate 82 of output transistor 36 and to the emitter connection of the photo sensor transistor pair 32–34, with the source 102 thereof being grounded. The programming current to the current synch 88 is provided through a programming resistor 106 whose value is chosen so as to provide the desired minimum operating current or turn on current threshold for output transistor 36, as will be described in greater detail hereinafter. Programming resistor 106 is preferably connected to gate 94, which is the current synch input, and is preferably operatively connected to the power supply for the light source 24,26 and 38. By utilizing the same power source for the light sources 24, 26 and 38 as for the programming or output circuitry 106–88–86, as the light output associated with the light sources 24, 26 and 38 varies due to variations in power, the current threshold level or operating level of the output transistor 36 will automatically adjust to compensate for these variations so that the field effect transistors 90, 92 and 36 will still turn on at the same point.

Preferably, a thermistor 108 is connected in series with the programming resistor 106 so as to adjust the current threshold or operating point for transistor 36 for temperature variations of the sensors 32, 34 occurring in cold temperature. In hot temperature, the impedance associated with the thermistor 108 becomes negligible whereas in cold temperatures, such as minus 55° centigrade, the thermistor 108 becomes a high impedance load, such as 1 megohm, in series with the resistor 106 and is preferably chosen so as to be substantially equivalent in impedance to the cold temperature impedance of programming resistor 106. Thus, the programming current becomes half of its normal temperature value so as to automatically compensate the current threshold level for the normal 50 percent decrease in sensor 32, 34 sensitivity in cold. Summarizing the operation of this circuit 80, the control transistor 90 provides a set voltage at its drain 98 for a preset input at gate 94. This insures that this voltage is now present at the gate 100 of transistor 92. Accordingly, the voltage at the drain 104 of transistor 92 is equivalent to the drain voltage of transistor 90 and the input current is synched at the level established by the programming resistor 106 which provides the input voltage to the gate 82 of transistor 36 to insure that transistor 36 will not conduct or turn on unitl the input current provided from the photo sensor 32 or 34 exceeds this programmed or preset value. As the input current is applied to the gate 94, the voltage builds up at the gate 94 and drain 98 until the drain 98 is synching this current. The voltage at the gate 94 and drain 98 when the drain is synching this current is the gate drive voltage necessary for transistor 90 to synch this current. Since transistor 92 is preferably identical to transistor 90, the voltage present at the drain 98 of transistor 90 will drive the gate 100 of transistor 92 to synch a current equivalent to this programmed input current provided through programming resistor 106. Transistor 92 synchs the output current provided from the photo sensor 32 or 34 until the associated output current value exceeds the programming current provided through programming resistor 106. When this programming current is exceeded, the voltage present at the drain 104 of transistor 92 rises rapidly driving output transistor 36 on. This programming current is preferably selected to be a value which is above the dark leakage current for the photo sensors and below that necessary for full drive of the output transistor 36.

If desired, thermistor 108 and programming resistor 106 could be replaced by utilizing an extra track on the coarse dis 14 which is half the normal width of the code pattern bands and is continuously opaque for this width so as to provide a light output to an associated photo sensor which is continuously illuminated for half its sensitive area for whichever light source 24 or 26 is on at the time, to provide an output current which is half the photo sensor full exposure output current so as to establish the current threshold or turn on level for output transistor 36 as this value. This half exposure output current is then provided as the input synching current to gate 94 of transistor 90 which then operates in the manner previously described with reference to the programming resistor 106. This alternative arrangement preferably compensates for aging of the disc 14 as well as for any contaminans which may be present on the disc, such as dust.

Preferably, a common programming resistor-thermistor 106–108 combination is provided to set the programming current for all of the amplifier switches 80 associated with the disc 14. As shown and preferred in FIG. 2, a separate programming resistor 106*a* and a separate thermistor 108*a* are provided to provide the programming current for the amplifier switches 80 associated with the photo sensors 40 of disc 14 since these values are equivalent, a single such programming resistor 106-thermistor 108 arrangement could be utilized for both the fine disc 12 and the coarse disc 14. It should be noted that the programming current, or the current at which the shunting transistor saturates, can be varied to any desired level.

Referring now to FIGS. 2,6, and 7 and particularly to FIGS. 6 and 7 the failure monitoring circuitry, generally referred to by the reference numeral 120, for testing for the operability of the optical encoder 10 circuitry shall be described in greater detail. The failure monitor circuitry 120 may be omitted if desired, however, inclusion of such circuitry increases the reliability of the optical encoder 10 system.

As shown and preferred in FIG. 7, when the failure monitor circuitry 120 is utilized, each of the code pattern bands or tracks, such as the bands contained on coarse disc 14, preferably includes a narrow light transmissable band 200 within the opaque regions 22 of each of the bands. As will be explained in greater detail hereinafter, the width of this narrow region 200 is preferably chosen so that the normal light output from the gallium arsenide diodes 24 or 26 is not sufficient to turn on the photo sensors 32 or 34 associated with the immuminated light source when the opaque region 22 is interposed between the light source and its associated sensors. Thus, under normal conditions, that is when the encoder 10 is not in the failure monitoring mode, opaque regions 22 on each of the bands are sensed as if the entire area 22 was opaque. Preferably, the code pattern bands, including the select track 18 on fine disc 12 also contain a similar functioning narrow light transmissable region 200 in the opaque regions of each of these bands for enabling failure monitoring with respect to disc 12. The failure monitor circuit 120 preferably includes a pair of transistor switches 122 and 124, with switch 122 being an NPN transistor and switch 124 preferably being a PNP transistor, although any other desired transistor configuration could be utilized. As shown and preferred, transistor switch 122 is the control transistor which receives the interrogate pulse provided from an external source which interrogate pulse is sent when it is desired to test the operability of the optical encoder 10 system. Transistor 122 has a base 126, a collector 128 and an emitter 130, with the emitter 130 being grounded and the interrogate pulse being provided to the base 126. Transistor switch 124 has a base 132, an emitter 134 and a collector 136, with the base 132 being connected in parallel to the collector 128 of transistor 122 and to the source of power for the light sources 38, 26, 24. The current supplied to the light sources 38, 26, 24 is provided through a pair of current limiting resistors 140 and 142 which control the current level of gallium arsenide diodes 38, 26 and 24. Preferably, current limiting resistor 140 is chosen to be twice the value of current limiting resistor 142 to which it is connected in series. The emitter 134 and collector 136 of transistor switch 124 are preferably connected across current limiting resistor 140.

The operation of the failure monitor circuit 120 is as follows. When an interrogate pulse is supplied to the base 126 of transistor switch 122, transistor 122 turns on. This supplies a potential to the base 132 of transistor switch 124 and turns on transistor 124. In the conduction state, transistor 124 provides a short circuit path from the power source to resistor 142 effectively providing a low impedance parallel or bypass path with respect to resistor 140. This bypass around resistor 140 preferably increases the current level to the gallium arsenide diodes 38, 26 and 24 by three times due to the relationship between resistor 140 and resistor 142 which, accordingly, increases the light output of these light sources 38,26 and 24 by three times. It should be noted, that in the failure mode, preferably all of the light sources 38, 26 and 24 are turned on simultaneously as opposed to light sources 26 and 24 alternating as in the normal operating condition of the encoder 10. The increased light output of the light sources 38, 26 and 24 are passing through the narrow light transmissable region 200 of each of the associated bands, on disc 12 and 14 is sufficient to turn all of the photo sensors would normally not be turned on by light passing through this region 200 when current limiting resistor 140 is not bypassed. The code produced by all of the photo sensors being illuminated is preferably chosen as to be a unique code which is not an acceptable altitude reportin code and can be easily distinguished by the use of conventional circuitry, not shown. If this unique code is produced, indicating that the internal circuitry of the encoder 10 is all operational, then a shift register (not shown) is preferably loaded with the altitude reporting code for transmission thereof. This interrogate pulse can be conventionally provided such as by a transponder which subsequently would accept the altitude reporting code information if the unique operability code was received in response to the interrogate pulse.

By utilizing the present invention, an optical encoder is provided which compensates for variations in sensor sensitivity due to both variations in environmental and internal conditions. It is to be understood that the above described embodiments of the invention are merely illustrative of the principles thereof and that numerous modifications and embodiments of the invention may be derived within the spirit and scope thereof.

What is claimed is:

1. In an optical encoder having at least one optically encoded rotatable disc containing an optically readable altitude reporting code pattern recorded thereon, said encoder including means for rotating at least said one disc to provide a predetermined code signal indicative of a predetermined altitude value, said one disc being opaque in a predetermined region of the surface area thereof while being light transmissable in an adjacent region of said one disc surface for providing at least one code pattern band on said one disc, said adjacent regions forming a transition point therebetween, a pair of spaced apart selectively illuminable light sources located on one side of said disc in optical alignment with said band for alternately illuminating said band, and a pair of spaced apart photo sensors being optically aligned with a different associated one of said light sources and being responsive thereto when said associated light source illuminates said photo sensor to provide an electrical signal therefrom comprising said predetermined code signal; the improvement comprising means for selectively illuminating said light sources for alternately illuminating said band to provide a U-type scan of said band with respect to said transition point, one of said photo sensors being positioned before said transition point in a direction of increasing count of said rotating disc, said other photo sensor being positioned after said transition point, said one sensor being a lead sensor said other sensor being a lag sensor, said lead and lag sensors being electrically directly connected together in parallel, said selective illumination means including means for providing illumination from said light source associated with said lag sensor until said rotating disc band is substantially at said transition point and means for providing illumination from said light source associated with said lead sensor substantially at said transition point, said illuminating providing means including means for switching said lag sensor associated light source off and said lead sensor associated light source on substantially at said transition point, whereby an encoded altitude reporting signal is provided from said optically encoded disc.

2. An improved optical encoder in accordance with claim 1 wherein said encoder includes another optically encoded light transmissable rotatable disc, said other disc being geared to said one disc for substantially simultaneous rotation therewith and having an optically encoded switching pattern thereon comprising a band having a plurality of spaced apart opaque regions, the spacing between said opaque regions providing light transmissable regions, means for optically sensing said opaque region and said adjacent light transmissable region for providing a switching signal to said switching means when said light transmissable region is optically sensed, said switching means being responsive to said switching signal to switch said lead sensor associated light source off and said lag sensor associated light source on, said switching means switching said lag sensor associated light source off and said lead sensor associated light source on in the absence of said switching signal.

3. An improved optical encoder in accordance with claim 2 wherein said switching pattern is arranged to provide a switching signal at substantially every 90° of rotation of said other disc.

4. An improved optical encoder in accordance with claim 2 wherein said one disc rotates at a lower angular velocity than said other disc, and said altitude reporting code pattern is a digital code comprising a plurality of bits, said plurality of bits comprising a most significant bit portion and a least significant bit portion, said one disc comprising a plurality of said code pattern bands for providing at least said most significant bit portion, said one disc code pattern bands comprising one code pattern band per most significant bit.

5. An improved optical encoder in accordance with claim 4 wherein said light source pair selectively illuminates all of said plurality of code pattern bands for said one disc, said optical encoder further comprising a separate pair of spaced apart photo sensors located on said one disc opposite side for each of said code pattern bands comprising said plurality, one sensor of each of said pairs of photo sensors being optically aligned with said one lead light source of said light source pair and the other sensor of each of said pairs of photo sensors being optically aligned with the other lag light source of said light source pair, each of said pairs of sensors being electrically directly connected together in parallel to provide an electrical signal output representative of said associated optically encoded bit, each of said sensor pairs providing a U-type scan of said associated band, said one lead sensor of each pair being positioned before said transition point for said associated band in a direction of increasing count of said one rotating disc, said other lag sensor of each pair being positioned after said associated band transition point; and means for combining said sensor pair outputs to provide said altitude reporting signal.

6. An improved optical encoder in accordance with claim 2 wherein said switching means comprises a first transistor switch means electrically connected to said one light source and a second transistor switch means electrically connected to said other light source, said first transistor means being electrically connected to said other disc optical sensing means and being biased thereby, said first transistor switch turning said associated one light source on when said other disc optical sensing means senses said switching pattern band light transmissable region, said first transistor further controlling the state of said second transistor, said second transistor and said other light source being in an on state when said first transistor is off an in an off state when said first transistor is on.

7. An improved optical encoder in accordance with claim 6 wherein said encoder includes a light source on the opposite side of said other disc from said optical sensing means in optical alignment with said switching band and said sensing means for illuminating said switching pattern band, said other disc light source and said light source pair being directly electrically connected in parallel.

8. An improved optical encoder in accordance with claim 7 wherein said light sources are gallium arsenide diode means and said other disc light source is further electrically connected to said second transistor through a voltage dividing means for biasing said second transistor on when said first transistor is off while reverse biasing said one gallium arsenide diode lag light source.

9. An improved optical encoder in accordance with claim 1 wherein said encoder further includes an output means operatively connected to said photo sensor pair for providing said electrical signal therefrom in one state and blocking said electrical signal in another state, and current-controlled switching means operatively connected to said photo sensor pair and said output means for controlling the state of said output means for biasing said output means to said one state only when said sensor provided electrical signal has an associated current value in excess of a predetermined current value.

10. An improved optical encoder in accordance with claim 9 wherein said current controlled switching means comprises means for providing a programmable switching point for said output means and means for synching the associated electrical signal output current of said sensor means until said associated current value exceeds said predetermined current value.

11. An improved optical encoder in accordance with claim 10 wherein said programmable switching means comprises a first field effect transistor means having a gate, a drain and a source with said first source being coupled to reference potential and said first field effect transistor drain being electrically coupled to said first field effect transistor gate and said first field effect transistor gate being electrically coupled to an input current source through a biasing impedance means for maintaining a predetermined potential at said first field effect transistor drain, said current synching means comprises said first field effect transistor means and a second field effect transistor means, said second field effect transistor having a gate, a drain and a source with said second source being coupled to reference potential and said second gate being coupled to said first drain, the potential at said second gate being equivalent to said predetermined potential and to said second drain potential, said second drain being coupled to said photosensor means output and to said output means input, said predetermined potential synching said current synching means at said predetermined current value through said biasing impedance to maintain said output means in said other state until said associated sensor means output current exceeds said predetermined current value.

12. An improved encoder in accordance with claim 11 wherein said output means comprises a third field effect transistor means having a gate, a drain and a source with said third source coupled to reference potential and said third gate coupled to said second drain and to said photo sensor output, said third drain providing said electrical signal output when said third field effect transistor is in said other state.

13. An improved optical encoder in accordance with claim 11 wherein said biasing impedance means comprises a programming resistance means, and said encoder further includes a thermistor means coupled in series with said programming resistance means for compensating for variations in sensor sensitivity due to variations in temperature.

14. An improved optical encoder in accordance with claim 11 wherein said encoder further includes a power source for driving said light sources, said power source further comprising said input current source through said biasing impedance with said light sources being coupled in parallel to said power source with said biasing impedance for compensating for variations in light source output due to variations in power.

15. An improved optical encoder in accordance with claim 10 wherein said programmable switching means comprises another code pattern band on said one disc, said other band being continuous and being half the width of said one band, said light sources illuminating said other band, another photo sensor means optically aligned with said other band and located on said one disc opposite side, said other band photo sensor being responsive to said light source illumination for providing an output current which is substantially half of the full exposure illumination current of said other band photo sensor, said other band photo sensor output current being said predetermined current value, all of said photo sensors being substantially matched, whereby compensation for said one disc aging and contaminants is provided.

16. In an optical encoder having at least one optically encoded rotatable disc containing an optically readable altitude reporting code pattern recorded thereon, said encoder including means for rotating at least said one disc to provide a predetermined code signal indicative of a predetermined altitude value, said one disc being opaque in a predetermined region of the surface area thereof while being light transmissable in an adjacent region of said one disc surface for providing at least one code pattern band on said one disc, said adjacent regions forming a transition point therebetween, a pair of spaced apart illuminable light sources located on one side of said disc in optical alignment with said band for illuminating said band, a pair of spaced apart photo sensors located on the opposite side of said disc in optical alignment with said band, each of said sensors being optically aligned with a different associated one of said light sources and being responsive thereto when said associated light source illuminates said sensor to provide an electrical signal therefrom comprising said predetermined code signal, and means for providing a U-type scan of said band with respect to said transition point, with one of said sensors being positioned to lead said transition point and the other sensor being positioned to lag said transition point; the improvement comprising an output means operatively connected to said photo sensor pair for providing said electrical signal therefrom in one state and blocking said electrical signal in another state, and current-controlled switching means operatively connected to said photo sensor pair and said output means for controlling the state of said output means for biasing said output means to said one state only when said sensor provided electrical signal has an associated current value in excess of a predetermined current value, current controlled switching means comprising means for providing a programmable switching point for said output means and means for synching the associated electrical signal output current of said sensor means until said associated current value exceeds said predetermined current value.

17. An improved optical encoder in accordance with claim 16 wherein said programmable switching means comprises a first field effect transistor means having a gate, a drain and a source with said first source being coupled to reference potential and said first field effect transistor drain being electrically coupled to said first field effect transistor gate and said first field effect transistor gate being electrically coupled to an input current source through a biasing impedance means for maintaining a predetermined potential at said first field effect transistor drain, said current synching means comprising said first field effect transistor means and a second field effect transistor means, said second field effect transistor having a gate, a drain and a source with said second source being coupled to reference potential and said second gate being coupled to said first drain, the potential at said second gate being equivalent to said predetermined potential and to said second drain potential, said second drain being coupled to said photo sensor means output and to said output means input, said predetermined potential synching said current synching means at said predetermined current value through said biasing impedance to maintain said output means in said other state until said associated sensor means output current exceeds said predetermined current value.

18. An improved optical encoder in accordance with claim 17 wherein said output means comprises a third field effect transistor means having a gate, a drain and a source with said third source coupled to reference potential and said third gate coupled to said second drain and to said photo sensor output, said third drain providing said electrical signal output when said third field effect transistor is in said other state.

19. An improved optical encoder in accordance with claim 17 wherein said biasing impedance means comprises a programming resistance means, and said encoder further includes a thermistor means coupled in series with said programming resistance means for compensating for variations in sensor sensitivity due to variations in temperature.

20. An improved optical encoder in accordance with claim 17 wherein said encoder further includes a power source for driving said light sources, said power source further comprising said input current source through said biasing impedance with said light sources being coupled in parallel to said power source with said biasing impedance for compensating for variations in light source output due to variations in power.

21. An improved optical encoder in accordance with claim 16 wherein said programmable switching means comprises another code pattern band on said one disc, said other band being continuous and being half the width of said one band, said light sources illuminating said other band, another photo sensor means optically aligned with said other band and located on said one disc opposite side, said other band photo sensor being responsive to said light source illumination for providing an output current which is substantially half of the full exposure illumination current of said other band photo sensor, said other band photo sensor output current being said predetermined current value, all of said photo sensors being substantially matched, whereby compensation for said one disc aging and contaminants is provided.

22. An improved optical encoder in accordance with claim 1 wherein said encoder further includes a power source for providing a current to said light sources for driving said light sources, said light sources having a predetermined light output in response to said provided current, an impedance means interposed between said power source and said light sources for limiting said provided current to a predetermined value, said light sources having a predetermined light output in response to said predetermined current value, and bypass means operatively connected in parallel with said impedance means for providing a path of substantially lower impedance than provided from said impedance means between between said power source and both of said light sources in response to a predetermined operability test signal for increasing the provided current to a predetermined multiple of said predetermined current value to simultaneously turn on both of said light sources, each of said light source light outputs increasing by said predetermined multiple, whereby both of said photo sensors are simultaneously turned on to provide a unique output signal therefrom different from said code signal in response to said test signal indicative of the operability of said optical encoder.

23. An improved optical encoder in accordance with claim 22 wherein said bypass means comprises a transistor switching means.

24. An improved optical encoder in accordance with claim 23 wherein said light sources comprise gallium arsenide diode means.

25. An improved optical encoder in accordance with claim 22 wherein said encoder further includes an output means operatively connected to said photo sensor pair and said output means for controlling the state of said output means for biasing said output means to said one state only when said sensor provided electrical signal has an associated current value in excess of said predetermined current value.

26. An improved optical encoder in accordance with claim 25 wherein said current controlled switching means comprises means for providing a programmable switching point for said output means and means for synching the associated electrical signal output current of said sensor means until said associated current value exceeds said predetermined current value.

27. An improved optical encoder in accordance with claim 16 wherein said encoder further includes a power source for providing a current to said light sources for driving said light sources, said light sources having a predetermined light output in response to said provided current, an impedance means interposed between said power source and said light sources for limiting said provided current to a predetermined value, said light sources having a predetermined light output in response to said predetermined current value, and bypass means operatively connected in parallel with said impedance means for providing a path of substantially lower impedance than provided from said impedance means between said power source and both of said light sources in response to a predetermined operability test signal for increasing the provided current to a predetermined multiple of said predetermined current value to simultaneously turn on both of said light sources, each of said light source light outputs increasing by said predetermined multiple, whereby both of said photo sensors are simultaneously turned on to provide a unique output signal therefrom different from said code signal in response to said test signal indicative of the operability of said optical encoder.

28. An improved optical encoder in accordance with claim 27 wherein said bypass means comprises a transistor switching means.

29. In an optical encoder having at least one optically encoded rotatable disc containing an optically readable altitude reporting code pattern recorded thereon, said encoder including means for rotating at least said one disc to provide a predetermined code signal indicative of a predetermined altitude value, said one disc being opaque in a predetermined region of the surface area thereof while being light transmissable in an adjacent region of said one disc surface for providing at least one code pattern band on said one disc, said adjacent regions forming a transition point therebetween, a pair of spaced apart illuminable light sources located on one side of said disc in optical alignment with said band for illuminating said band, a pair of spaced apart photo sensors located on the opposite side of said disc in optical alignment with said band, each of said sensors being optically aligned with a different associated one of said light sources and being responsive thereto when said associated light source illuminates said sensor to provide an electrical signal therefrom comprising said predetermined code signal, means for providing a U-type scan of said band with respect to said transition point, with one of said sensors being positioned to lag said transition point, and a power source for providing a current to said light sources, said light sources having a predetermined light output in response to said provided current; the improvement comprising an impedance means interposed between said power source and said light sources for limiting said provided current to a predetermined value, said light sources having a predetermined light output in response to said predetermined current value, and bypass means operatively connected in parallel with said impedance means for providing a path of substantially lower impedance than provided from said impedance means between said power source and both of said light sources in response to a predetermined operability test signal for increasing the provided current to simultaneously turn on both of said light source light outputs increasing by said predetermined multiple, whereby both of said photo sensors are simultaneously turned on to provide a unique output signal therefrom different from said code signal in response to said test signal indicative of the operability of said optical encoder.

30. An improved optical encoder in accordance with claim 29 wherein said bypass means comprises a transistor switching means.

* * * * *